April 15, 1947.  T. L. O'BRIEN  2,419,154
BEACH COMBING APPARATUS
Filed Dec. 10, 1943  2 Sheets-Sheet 1
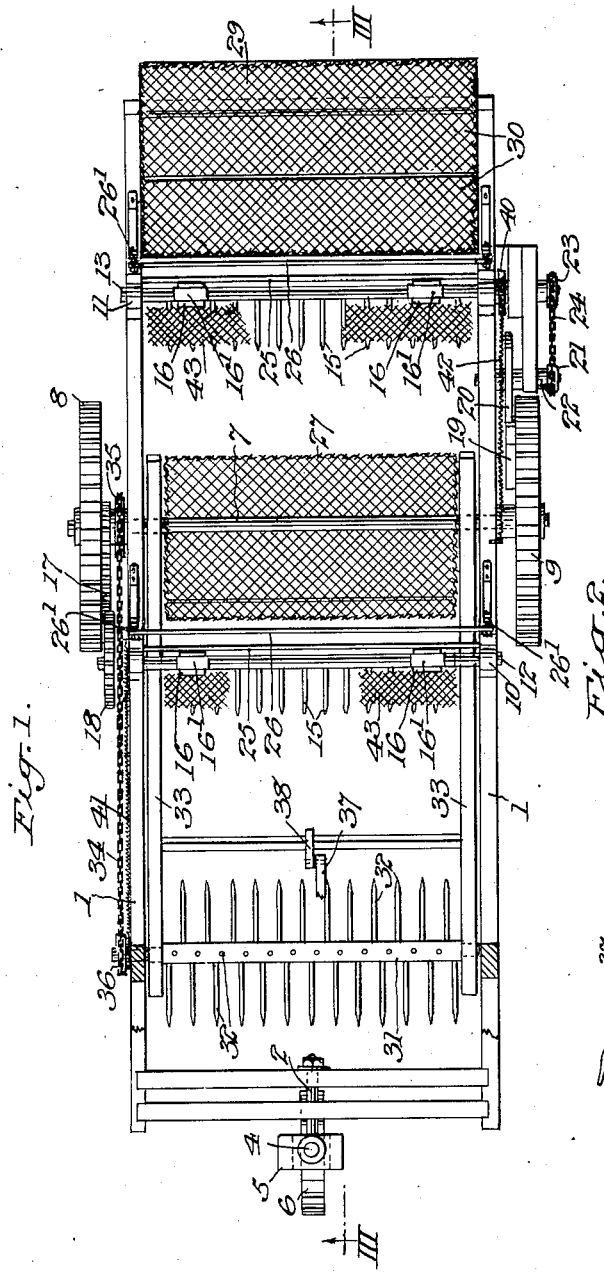
INVENTOR.
Thomas L. O'Brien
BY
Brown & Seward
ATTORNEYS April 15, 1947.   T. L. O'BRIEN   2,419,154
BEACH COMBING APPARATUS
Filed Dec. 10, 1943   2 Sheets-Sheet 2
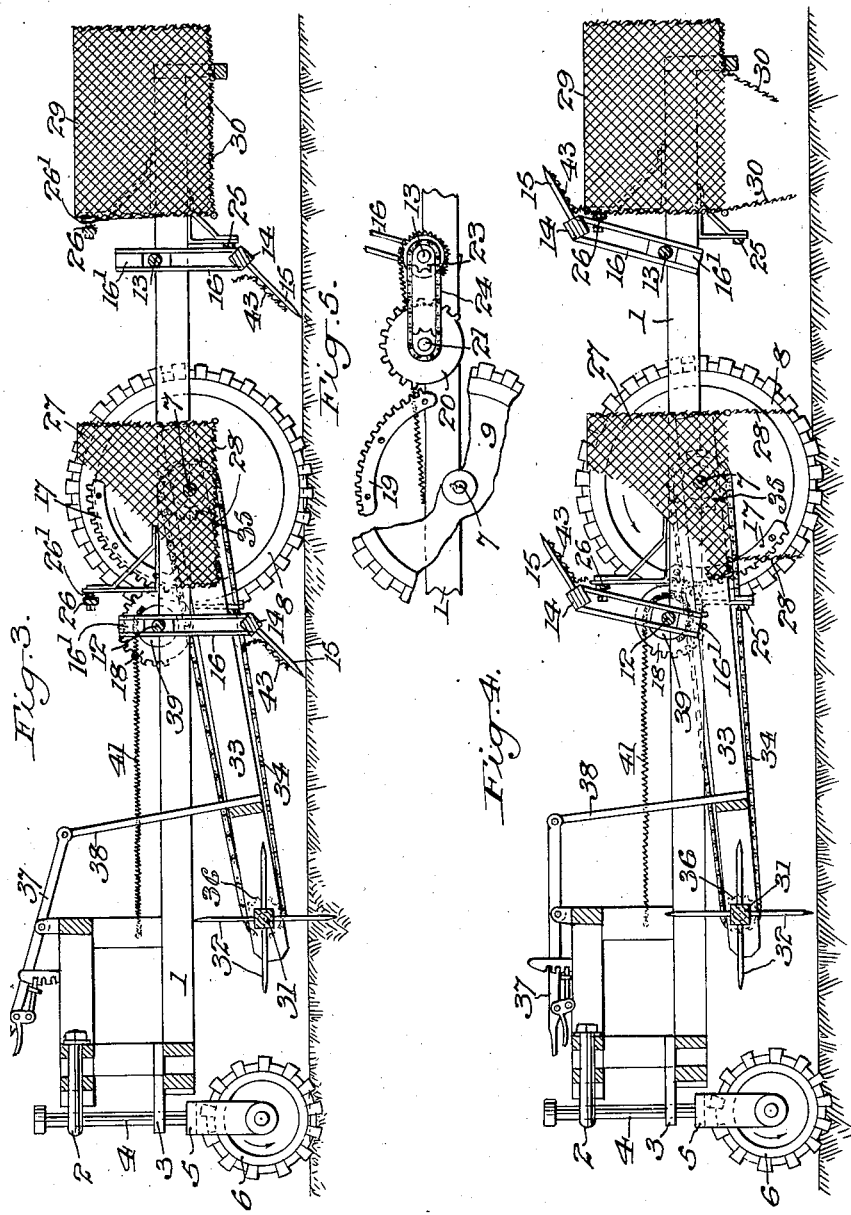
INVENTOR.
Thomas L. O'Brien
BY
Brown + Seward
ATTORNEYS Patented Apr. 15, 1947

2,419,154

UNITED STATES PATENT OFFICE 2,419,154

BEACHCOMBING APPARATUS

Thomas L. O'Brien, Far Rockaway, N. Y.

Application December 10, 1943, Serial No. 513,814

13 Claims. (Cl. 55—17)

This invention relates to a beach combing apparatus and particularly to a vehicle which may be moved over a sandy area to be cleaned and which will neatly and efficiently pick up and remove rubbish and litter of all kinds from such area.

An object of the invention is to provide an apparatus of simple construction which will be inexpensive to build, operate and maintain.

A further object is to provide such an apparatus in which a plurality of combing devices are operated intermittently in such a way that all sections of the path over which the apparatus passes are cleaned by at least one of said devices.

Another object is to provide certain improvements in the form, construction, and arrangement of the parts whereby the above named and other objects may effectively be attained.

A practical embodiment of the invention is shown in the accompanying drawings, in which:

Fig. 1 represents a top plan view of the apparatus, parts being broken away;

Fig. 2 represents a longitudinal elevation showing the left side of the apparatus, parts being broken away;

Fig. 3 represents a longitudinal vertical section taken along the line III—III of Fig. 1, the combing devices being in their pick-up position;

Fig. 4 represents a longitudinal vertical section as in Fig. 3, the combing devices being in their discharge position, the agitator being raised and the baskets opened; and Fig. 5 represents a detail side elevation of parts of the drive for the rear combing device, the parts being in a position corresponding to that of the rear combing device in Fig. 4.

Referring to the drawings, the apparatus comprises a chassis frame 1, generally rectangular in shape, having bearings 2, 3 for the post 4 of a yoke 5 in which is mounted a single front steering wheel 6. A tiller, cross-tree or towing handle, not shown, may be mounted on the post 4 so that the apparatus may be drawn and steered through a single connection or through different means.

The chassis frame 1 is also provided with bearings for the axle 7 on which the driving and traction wheels 8, 9 are fixed as by means of keys, splines or the like; and bearings 10, 11 for the front and rear comb axles 12 and 13 respectively. Each combing device comprises a bar 14 provided with teeth 15 and connected by arms 16 to the axle 12 or 13 so that oscillation of the said axles will swing the combing devices between their pick-up and discharge positions. The projecting ends of the arms 16 are preferably provided with counter-weights 16' for balancing the weight of the combing devices, either alone or with an average load.

The driving means for the front combing device includes a gear segment 17, which may be mounted on the wheel 8, and a mutilated gear 18 fixed on one end of the axle 12, the teeth on said gear 18 being arranged to mesh with the teeth of the gear segment 17 to effect rotation of the axle 12 through slightly more thant 180°, as clearly shown in Figs. 3 and 4. The driving means for the rear combing device includes a gear segment 19, mounted on the wheel 9, a mutilated gear 20, a sprocket 21 fixed on a common hub 22 with the gear 20, a sprocket 23 fixed on one end of the axle 13, and a drive chain 24 passing over the sprockets 21 and 23. The teeth on the gear 20 and the gear segment 19 are arranged in the same manner as the teeth on the parts 18 and 17, so as to effect rotation of the axle 13 through slightly more than 180°, as shown in Figs. 3, 4 and 5. It will be understood that the sprockets 21, 23 and chain 24 permit spacing of the rear combing device a sufficient distance behind certain other parts of the apparatus for adequate clearance during the swinging of the device.

Rotary motion of the combing devices is limited by the provision of lower stop bars 25, 25 and upper stop bars 26, 26, supported from the frame 1 on suitable brackets. The bars 26, 26 are preferably so supported that they will yield under pressure of the arms 16 as the combing devices reach their discharge position; this yielding support resulting from the provision of compression springs 26', 26' on the bolts which secure the bars 26, 26 to their brackets. A refuse basket 27 is mounted in the frame 1 adjacent the bar 26 of the front comb, the basket being provided with doors 28 in its bottom to facilitate removal of the refuse; the basket may, if desired, be shaped to fit over the axle 7, so that it can be removed for emptying. A second refuse basket 29 having doors 30 is permanently or removably mounted at the rear of the frame 1 adjacent the upper stop bar 26 of the rear comb.

In order to bring partially buried refuse to the surface in a position to be picked up by the combing devices, there is provided an agitator consisting of a shaft 31 having four rows of teeth 32. The agitator shaft 31 is mounted adjacent the free end of a frame 33, the other end of which may conveniently be hinged on the wheel axle 7, and the agitator is rotated by means of a drive chain 34 engaging a sprocket 35 on the axle 7 and a sprocket 36 on the shaft 31; the speed of rotation of the agitator being preferably such that the circumferential speed of the teeth 32 is somewhat in excess of the ground speed of the vehicle, so that the teeth will dig through the sand and throw to the surface any refuse which may be partially or slightly buried. The agitator may be raised out of contact with the ground by the operation of the hand lever 37, connected to the frame 33 by the link 38. In its lowered position the agitator may desirably be permitted to rest freely on the ground and to rise and fall by its own weight as its teeth encounter solid obstructions, in order that the teeth may not be broken, but if the ground is substantially free from such obstructions, the agitator may be held fixedly in its digging position by locking the hand lever 37 in the appropriate position.

The axles 12 and 13 are provided with drums or sheaves 39, 40, respectively, to which are secured the ends of springs 41, 42, the other ends of which are secured at suitable points on the chassis frame 1. The springs 41, 42 are wound on the drums or sheaves 39, 40 as the combing devices are raised, and the tension of said springs assures prompt return of said devices from their discharge position to their pick-up position as soon as the gear segments and mutilated gears pass out of mesh with the devices in the position shown in Fig. 4. Strips of strong wire screening or the like 43 may be secured across the teeth of the combing devices, leaving the ends of the teeth exposed for engagement with the sand to a slight extent and projecting a short distance above the bars 14, such screening serving to assure efficient collection and lifting of refuse without objectionable amounts of sand.

In operation the apparatus is intended to be drawn, as by a horse or small tractor, although its adaptation for self-propulsion is contemplated as a desirable possibility in some cases. As the apparatus passes over a surface to be cleaned the agitator operates continuously to bring loosely to the surface any refuse which may be imbedded in the sand, and to stir up and loosen that which is already on the surface. During that part of its travel when the gear segments 17, 19 are not in mesh with the gears 18, 20, substantially all of the refuse in the path of travel will be collected by the front combing device. When the gear segments and gears come into mesh both of the combing devices are raised simultaneously to discharge the collected refuse into their respective baskets; during this interval the front combing device cannot collect refuse in the path of the apparatus, which passes over it for a distance somewhat greater than the projection of the length of the gear segments on the ground. This distance is less than the distance between the front and rear combing devices, so that the rear combing device is returned to its pick-up position at a point where it will collect any refuse passed over by the front combing device while the latter was being raised. The tandem arrangement of the combing devices thus provides complete coverage of the area to be cleaned notwithstanding the intermittent operation of said devices.

The several parts are operated from different points in the traction or driving wheel assembly in order to distribute the stresses thereon and to facilitate a corresponding distribution of weight; it is possible, however, to drive both combing devices from the same side of the vehicle, which may be the same as or different from the side on which the agitator drive is located, although the arrangement shown is believed to be preferable and has been found practical.

The apparatus has been described with particular reference to its use in removing refuse from beaches, but it is obviously adaptable, with little or no alteration, to the collecting of small stones or the like from any reasonably level surface and to the collecting of potatoes or the like when lying loosely on or near the surface of the ground. The apparatus may also be drawn over a submerged surface to gather shell-fish such as crabs, oysters or clams. The use of the term "refuse" is accordingly not intended to be restrictive.

It will be understood that various changes may be resorted to in the form, construction and arrangement of the several parts, without departing from the spirit and scope of my invention, and hence I do not intend to be limited to the details herein shown and described, except as they may be included in the claims.

What I claim is:

1. An apparatus of the character described comprising, a chassis frame, wheels supporting said frame, a plurality of combing devices pivotally mounted on said frame in tandem relation, means for holding said devices in pickup position, automatic means for lifting said devices intermittently from pick-up to discharge position and automatic means for returning said devices to pick-up position, said lifting means being operatively connected to said wheels and said returning means being operatively connected to the frame and to the combing devices.

2. An apparatus according to claim 1 in which the combing devices are lifted and returned substantially simultaneously with each other.

3. An apparatus according to claim 1 in which the wheels include driving wheels and in which the means for lifting the combing devices are actuated by rotation of said wheels.

4. An apparatus according to claim 1 in which the returning means includes a spring.

5. An apparatus according to claim 1 in which the wheels include driving wheels and in which the means for lifting one combing device comprises an intermittently operative connection with one of said wheels and the means for lifting another combing device comprises an intermittently operative connection with another of said wheels.

6. An apparatus according to claim 5 in which said intermittently operative connections include gear segments associated with the driving wheels and mutilated gears associated with the combing devices.

7. An apparatus of the character described comprising, a chassis frame, a pair of driving wheels supporting said frame and fixed on a common axle, a front combing device pivotally mounted on an axle in front of the wheel axle, a rear combing device pivotally mounted on an axle in the rear of the wheel axle, said devices being adapted to swing forward and upward along corresponding paths, and operating means adapted intermittently to reciprocate said devices about their axles and along said paths.

8. An apparatus according to claim 7 in which the operating means comprises a gear segment associated with a driving wheel, and a mutilated gear associated with a combing device.

9. An apparatus according to claim 7 in which the operating means comprises a gear segment associated with each driving wheel, and a mutilated gear operatively connected with each combing device.

10. An apparatus of the character described comprising, a chassis frame, driving wheels supporting said frame, a plurality of combing devices pivotally mounted at fixed points on said frame in tandem relation, an agitator pivotally mounted in said frame and positioned in front of said combing devices, and means operatively connected to the driving wheels for operating said agitator and said devices.

11. An apparatus of the character described comprising, a chassis frame, driving wheels supporting said frame, a plurality of combing devices pivotally mounted at fixed points on said frame in tandem relation, an agitator pivotally mounted in said frame and positioned in front of said combing devices, means operatively connected to the driving wheels for rotating continuously the agitator and means operatively connected to the driving wheels for moving intermittently the combing devices.

12. An apparatus of the character described comprising, a chassis frame, driving wheels supporting said frame, a plurality of combing devices pivotally mounted on said frame in tandem relation, an agitator pivotally mounted in said frame and positioned in front of said combing devices, means driven by the driving wheels for rotating continuously the agitator, an intermittently operative connection with one driving wheel for operating one combing device and an intermittently operative connection with another driving wheel for operating another combing device.

13. An apparatus according to claim 12 in which said intermittently operative connections include gear segments associated with the driving wheels and mutilated gears associated with the combing devices.

THOMAS L. O'BRIEN.

REFERENCES CITED

The following references are of record in the file of this patent:

UNITED STATES PATENTS

| Number | Name | Date |
|---|---|---|
| 1,157,931 | Eskett | Oct. 26, 1915 |
| 1,274,244 | Corey | July 30, 1918 |
| 1,442,979 | Shaw | Jan. 23, 1923 |
| 2,093,148 | Hoofnagle | Sept. 14, 1937 |

FOREIGN PATENTS

| Number | Country | Date |
|---|---|---|
| 128,294 | German | Feb. 17, 1902 |
| 30,783 | Australian | 1930 |